Figure 1:
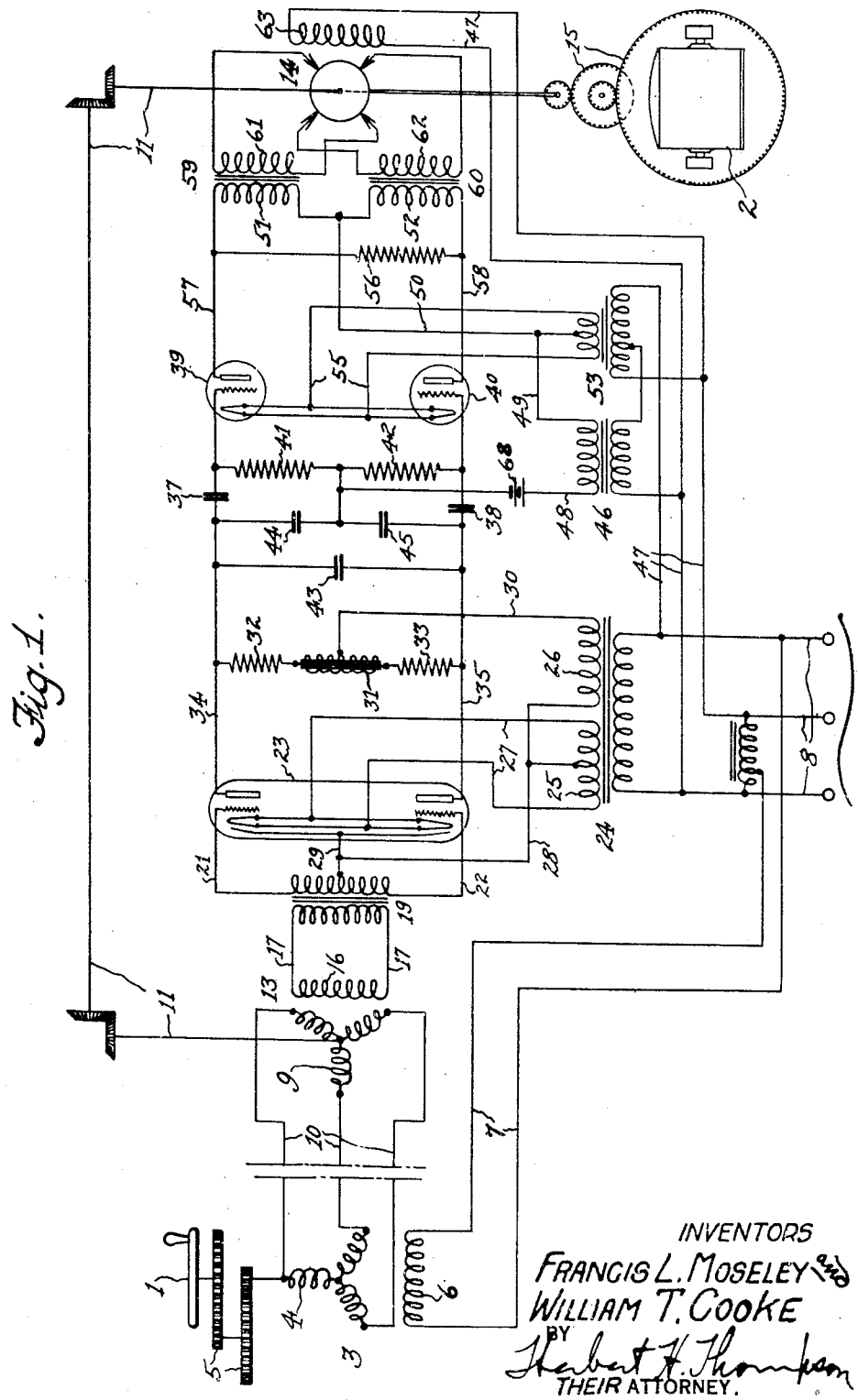

Aug. 30, 1949.　　　F. L. MOSELEY ET AL　　　2,480,157
POSITION CONTROL SYSTEM
Filed March 16, 1935　　　　　　　　　　　2 Sheets-Sheet 1

INVENTORS
FRANCIS L. MOSELEY and
WILLIAM T. COOKE
BY Herbert H. Thompson
THEIR ATTORNEY.

INVENTORS
FRANCIS L. MOSELEY
WILLIAM T. COOKE
BY
Herbert H. Thompson
THEIR ATTORNEY.

Patented Aug. 30, 1949

2,480,157

UNITED STATES PATENT OFFICE 2,480,157

POSITION CONTROL SYSTEM

Francis L. Moseley, Pelham, and William T. Cooke, Pelham Manor, N. Y., assignors to The Sperry Corporation, a corporation of Delaware Application March 16, 1935, Serial No. 11,424

21 Claims. (Cl. 318—30)

This invention relates, generally, to electrical control systems, and the invention has reference, more particularly, to a novel improved continuously operable electrical position control system wherein a controlling object is arranged to operate through suitable electrically operable means to cause a controlled object to move in substantial synchronism with the controlling object.

Position control or follow-up systems heretofore employed have often been more or less unsatisfactory in use owing to the tendency of the controlled object to lag or fall angularly behind the controlling object resulting from inherent deficiencies of the systems, thereby rendering such systems unsuitable for important uses, such as ship gun control, where it is essential that there be no appreciable time lag in the system in order that motion of the ship shall not adversely affect the accuracy of fire at long range. Such systems are especially unsatisfactory in cases where the moment of inertia of the controlled object is considerable, owing to the tendency of such object to either lag or overshoot its proper position with respect to the controlling object. In these systems, the motive means driving the controlled object is generally operated in response to the departure of the controlling object from the position of correspondence with the controlled object, i. e., in response to $\theta$ or relative angular displacement, such systems utilizing either mechanical contacts or vacuum tubes.

In the absence of friction and of any initial displacement and/or velocity, the torque necessary to accelerate a controlled rotatable object is proportional, theoretically, to a constant I, the moment of inertia of the object about its axis of rotation, and to the angular acceleration of the object, and may be expressed as follows:

$$L = \frac{I d^2\theta}{dt^2}$$

wherein the angular acceleration is the second derivative of the angular displacement with respect to time.

However, since no repeating system can act with infinite rapidity and since all corporeal bodies may have initial displacements and velocities, when dealing with such systems it follows that any motion of the controlling object at a certain instant of time "$t$" will be repeated by the controlled object at the instant "$t+\Delta t$". The relative motion of the controlled object with respect to the controlling object may be represented by the relative angular displacement of the objects or $\theta$, which is a continuous function of time and whose value at time $t+\Delta t$ is $\theta(t+\Delta t)$. With $\Delta t$ relatively small in comparison with $t$, the value of this function may be expanded into a converging series as follows:

$$\theta(t+\Delta t) = t\theta + \Delta t \frac{d\theta}{dt} + \frac{\Delta t^2}{\angle 2} \frac{d^2\theta}{dt^2} +$$

$$\frac{\Delta t^3}{\angle 3} \frac{d^3\theta}{dt^3} + \cdots + \frac{\Delta t^n}{\angle n} \frac{d^n\theta}{dt^n}$$

A position control system that utilizes at least one, though preferably two terms of the above expansion in addition to the first term "$t\theta$", will give a degree of approximation that is found entirely satisfactory in use. The value of the second and third terms will be evident when it is noted that the angular motion of the controlling object with respect to the controlled object would commence in a substantially parabolic manner, such that $$\theta = \frac{a}{2}t^2$$

($a$=angular acceleration) in which case the first term of the series is relatively insignificant since $t$ is small and the square thereof is negligible. The second term of the series is proportional to the derivative with respect to time of the relative angular displacement, i. e., "$at$", which is somewhat larger and hence more important than the first term, whereas the third term of the series is proportional to the second derivative with respect to time of the relative angular displacement, i. e., "$a$", which is of relatively large magnitude and hence of considerable importance in enabling the system to anticipate the motion of the controlling object. It will be apparent, therefore, that in those systems where the motive means driving the controlled object is operated merely in response to the departure of the controlling object from the position of correspondence with the controlled object, or $\theta$, true synchronism of the objects can hardly be obtained.

The principal object of the present invention is to provide a novel position control system that overcomes the above recited defects of previous systems, the said novel system being so constructed and arranged as to cause the controlled object to move in substantial synchronism with the controlling object regardless of the mass of the controlled object and its associated parts, or of the relative acceleration or deceleration of the controlling object with respect to the controlled object, the controlled object being brought to rest, upon the stopping of the controlling object, in substantial correspondence with the latter and without hunting.

Another object of the present invention lies in the provision of a novel position control system of the above character wherein the motive means driving the controlled object is not only operated in response to the change in the relative angular position of the controlling object with respect to the controlled object, but in addition this motive means is also operated in response to one or more higher derivatives of the angular displacement with respect to time, i. e., to the velocity and/or acceleration or deceleration of the controlling object with respect to the controlled object, whereby the motion of the controlling object is anticipated and the controlled object actuated accordingly, so that the latter object is substantially maintained in correspondence with the controlling object regardless of variations in acceleration or direction of movement of the latter or of the inertia of the former.

Still another object of the present invention is to provide a novel position control system of the above character that employs electron tube means, to which is supplied the relative angular displacement signal voltage received from the controlling object means, said electron tube means serving partly as a rectifier and partly as an amplifier, as amplified alternating signal voltage being applied to the grids of grid controlled rectifier means, whereas the rectified signal voltage is so applied across an impedance that a D. C. component flows therein, the magnitude of which depends on the relative displacement of the controlling object with respect to the controlled object, and the direction of which depends on the direction of relative displacement of the controlling object with respect to the controlled object, said impedance means serving, in the event said D. C. component varies, to produce thereacross a voltage that is in phase with the time rate of change of displacement; the displacement and first derivative voltages being applied to an additional impedance means designed so that potentials proportional to the rate of change of these voltages with respect to time are produced, such derived D. C. surge potentials or voltages corresponding to the first and second time derivatives of the displacement voltage, i. e., to the relative velocity and acceleration of the controlling object with respect to the controlled object; the said derived D. C. potentials or voltages being passed along with the amplified A. C. displacement signal potential on to the grids of said grid controlled rectifier means that control the power motive means actuating the controlled object, whereby the torque applied to the controlled object is responsive to the relative displacement, velocity and acceleration or deceleration of the controlling object with respect to the controlled object.

Figure 2:
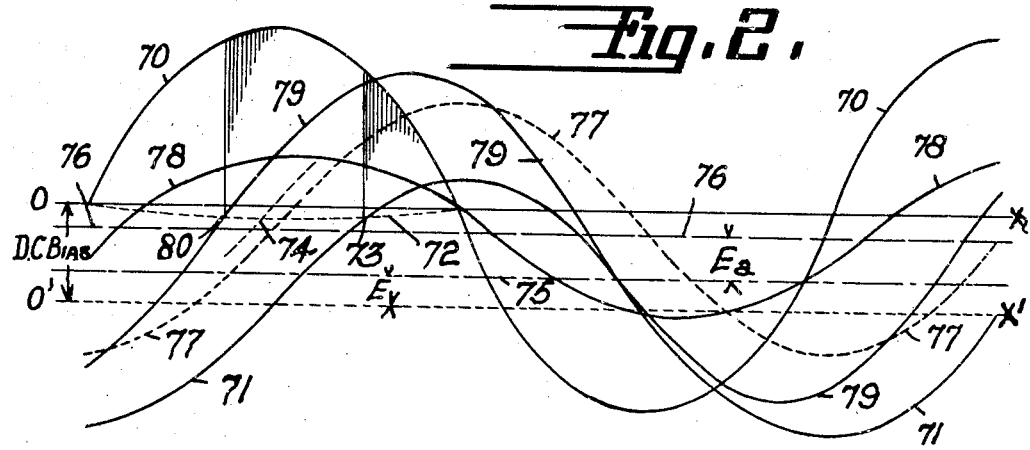
Figure 3:
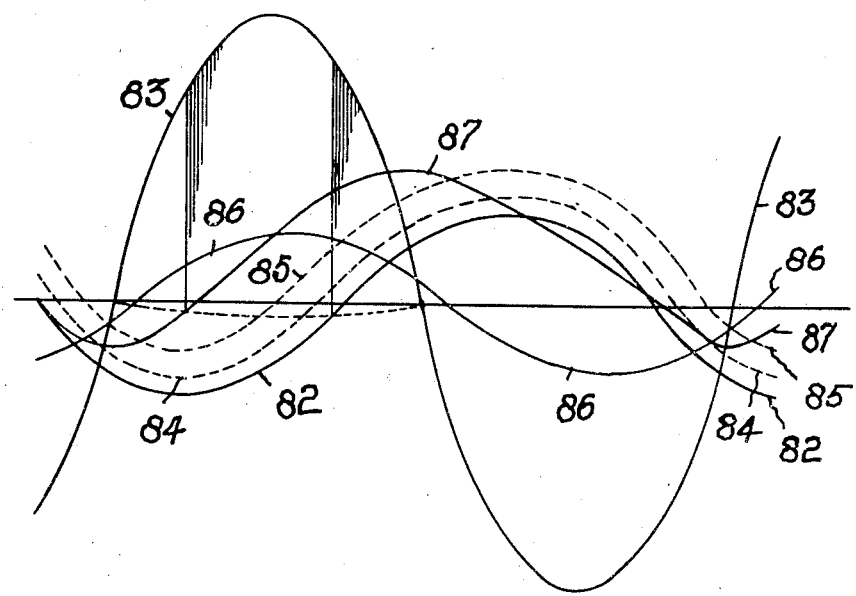

Other objects and advantages will become apparent from the specification, taken in connection with the accompanying drawings wherein Fig. 1 is a wiring diagram illustrating an embodiment of the novel position control system of this invention, and Figs. 2 and 3 are diagrams of potentials obtaining on the grid and plate of a grid controlled rectifier employed in the invention.

Referring now to Fig. 1 of the said drawings, the controlling object 1 is illustrated as a handwheel, although the same might be any small power, i. e. sensitive, turnable object, such as a telescope, the angular motion of which is to be accurately and immediately repeated by the searchlight 2 or other controlled object, through the operation of the novel position control system of this invention. A transmitter 3 has its polyphase rotor 4 mechanically connected through speed reduction gearing 5 to the handwheel 1. Transmitter 3 is of a well known type and has its stator winding 6 excited with alternating current by leads 7 connected to a suitable source of alternating voltage, represented by three phase supply lines 8. The rotor 4 is in inductive relation to the stator 6 and its three windings are so wound that the A. C. in winding 6 produces in rotor 4 an alternating magnetic field having a position in space determined by the relative position of winding 4 with respect to winding 6.

Any rotation of the transmitter rotor 4 caused by angular movement of the handwheel 1 produces a corresponding angular shifting of the axis of the magnetic field in rotor 9 of a receiver 13. Rotor 9 is electrically connected to rotor 4 by leads 10 and is mechanically connected by suitable follow-up transmission means 11 to the rotor of a repulsion or other motor 14 that drives the searchlight 2 through reduction gearing 15. During such unbalanced condition, the pulsating field of rotor 9 will induce an alternating electromotive force in the receiver stator winding 16, the value of which is substantially proportional to the angular displacement between the handwheel 1 and searchlight 2. When the stator 16 is at right angles to the field of rotor 9, the voltage induced in stator 16 is zero, and when this stator is parallel to the field of rotor 9, i. e., in the same position in space, a maximum voltage is induced in stator 16.

The terminals of stator 16 are connected by leads 17 to the primary winding of a transformer 19, the secondary winding of which has its terminals connected by leads 21 and 22 to the grids of an electron tube 23 having two sets of three electrodes arranged in push-pull or opposition. Thus, any alternating signal voltage supplied from the receiver 13 is impressed on the two grids of tube 23 in 180° out of phase relation.

A transformer 24 has its primary connected across two of the supply leads 8. Transformer 24 has two secondaries 25 and 26. Secondary 25 serves to supply filament current to tube 23 by means of leads 27, whereas secondary 26 serves to supply alternating voltage to the anodes of tube 23 by means of a lead 30 connected to the mid tap of a choke coil 31 having an iron core, the ends of the choke coil 31 being respectively connected through resistors 32 and 33 and leads 34 and 35 to the anodes of tube 23. Leads 28 and 29 connect secondary winding 26 to the mid tap of the secondary winding of transformer 19 and to the cathodes of tube 23.

Any alternating signal voltage supplied from receiver 13 is amplified by transformer 19 and impressed on the grids of tube 23 in 180° out of phase relation, so that such amplified signal voltage is added to the potential at one of the grids in phase with the plate voltage, and added at the other grid out of phase with the plate voltage, depending upon the phase relation of the signal, i. e., upon whether the handwheel 1 is being turned in one direction or the other, and the magnitude of such amplified displacement signal potential will depend at any time upon the relative angular displacement of the handwheel and the searchlight.

Thus tube 23 serves as a phase detector in detecting the phase of the displacement signal corresponding to the relative direction of rotation of the handwheel with respect to the searchlight, and this tube also amplifies the alternating displacement signal potential, serving to deliver an amplified alternating signal potential to one of its output leads 34 and 35, depending upon the phase relation of the signal, i. e., upon whether the handwheel 1 is being turned in one direction or the other. Output leads 34 and 35 are connected respectively through condensers 37 and 38 to the grids of gas or vapor containing grid controlled rectifier tubes 39 and 40, so that the amplified displacement signal potential corresponding to relative displacement of the objects is applied to the grid of one of these tubes 39 and 40.

Tube 23 also serves as a rectifier in that it draws current from secondary 26 through the impedance consisting of the resistance or choke coil 31 and resistors 32 and 33, the current from secondary 26 dividing at the mid tap of choke coil 31, so that part of this current flows through one half of coil 31 and through resistor 32, whereas the remainder flows through the other half of coil 31 and through resistor 33.

When a displacement signal potential is being amplified by the tube 23, the currents flowing in the two halves of choke coil 31 will be unequal because of the phase relations between the A. C. plate supply to tube 23 and the A. C. signal potential applied to the grids thereof, i. e., when the signal potential is of one phase, one of the plate circuits of tube 23 draws a large current, whereas the other plate circuit of this tube draws a small current, and when the phase of the signal potential reverses due to reversed relative displacement of the objects, the larger current is transferred to the other half or plate circuit of tube 23.

Thus an unbalanced D. C. component flows in choke coil 31 and in the resistors 32 or 33, the magnitude of which depends on the relative displacement of the objects, and the direction of which depends on the direction of such relative displacement. The presence of this D. C. component in choke coil 31, due to the resistance of its windings, causes a voltage drop across the choke coil and the same is true to a much larger extent of the resistors 32 and 33, the said total voltage drop between leads 34 and 35 being in phase with, i. e. of a sign determined by the direction of the displacement and proportional to the magnitude thereof. In some of the claims hereof, the word "sign" is used as a generic term to denote either the phase or direction of an alternating or direct current. If this D. C. component varies, an additional voltage is induced across the choke coil 31, which induced voltage is in phase with the time rate of change of displacement, i. e., velocity, or the first derivative of displacement with respect to time.

Thus, if the relative displacement of objects 1 and 2 is changing, two D. C. voltages appear across leads 34 and 35, one proportional to and in phase with the relative displacement of the objects and the other proportional to and in phase with the relative velocity thereof. The combination of these two voltages and also the A. C. primary signal above referred to is applied to condensers 37 and 38 and if these two voltages are changing, the time rate of change or the first derivatives thereof with respect to time are passed onto the grids of the grid controlled rectifiers 39 and 40 in 180° out of phase relation, i. e., D. C. voltages corresponding to the first and second derivatives of displacement with respect to time are applied to the grids of tubes 39 and 40. If the relative displacement of the objects is not changing, neither of these voltages will be present, and if the relative displacement is changing uniformly, only one, the first derivative of displacement with respect to time, will appear, but if the relative displacement of the objects is changing with acceleration or deceleration, both voltages will appear.

Similar resistors 41 and 42 are connected between leads 34 and 35 beyond the condensers and these resistors cooperate with condensers 37 and 38 in applying time derivative voltages to the grids of tubes 39 and 40, the said resistors completing the circuit for currents resulting from such voltages. A condenser 43 is connected between leads 34 and 35 and condensers 44 and 45 are also connected in series across these leads. Condensers 43, 44 and 45 serve to smooth out voltage ripples. If desired, condenser 43 could be omitted.

As is well known by persons skilled in the art, the average value of the current flowing in the anode circuits of the grid controlled rectifier tubes 39 and 40 can be varied by varying the phase relationship between the voltages applied to the grids and the anodes, respectively. Alternating voltage is supplied to the grids of tubes 39 and 40 in in-phase relation by means of a transformer 46 supplied from the A. C. leads 8 through leads 47 and a portion of the primary of a filament supply transformer 53. One end of the secondary of transformer 46 is connected by lead 48 through resistances 41 and 42 and condensers 44, 45, 37 and 38 to the grids of tubes 39 and 40. A battery 68 is preferably included in lead 48 for applying an additional D. C. bias to the grids of tubes 39 and 40.

The other end of the secondary of transformer 46 is connected by leads 49 and 50 to the windings 51 and 52 of motor control transformers 59 and 60. Lead 50 also connects with the mid tap of the secondary of the filament supply transformer 53 having its primary supplied from leads 47. The secondary of this transformer supplies filament current to tubes 39 and 40 through leads 55. A resistance 56 connected across the anode leads 57 and 58 of tubes 39 and 40 serves to improve the operation of these tubes as disclosed and claimed in the patent to Francis L. Moseley, No. 2,010,014.

One pair of brushes of the repulsion motor 14 is connected across the winding 61 of transformer 59, whereas the other pair of brushes of this motor is connected across the winding 62 of transformer 60. The field winding 63 of motor 14 is supplied with A. C. by leads 47 so that an alternating potential is induced in the rotor of this motor and therefore potentials appear across the brushes of this rotor which are applied to the transformer windings 61 and 62. Hence, when the tube 39 is rendered conducting, the winding 61 of transformer 59 is shorted, in effect, and motor 14 operates in one direction, whereas when the tube 40 is rendered conducting, the winding 62 of transformer 60 is shorted, in effect, and motor 14 operates in the opposite direction, the speed of operation of the motor depending upon the magnitude of current flowing in the tube output circuit. The phase of the biasing voltage supplied to the grids of tubes 39 and 40 is so adjusted that, in the absence of a signal potential or voltage, only a small stand-by current flows in the output circuits of tubes 39 and 40.

As long as the controlling object is not displaced with respect to the controlled object or searchlight 2, no signal voltage is supplied to the grids of the grid controlled rectifier tubes 39 and 40, but as soon as the handwheel 1 starts to turn with respect to the searchlight 2, the amplified alternating displacement signal potential from tube 23, and a D. C. surge potential dependent on the first time rate of change of displacement, i. e., $$\frac{d\theta}{dt}$$

or velocity, and on the second time rate of change of displacement, i. e., $$\frac{d^2\theta}{dt^2}$$

or acceleration, are impressed on the grids of the tubes 39 and 40 in 180° out of phase relation, so that the resultant of such potentials are additive to the A. C. and D. C. bias supplied from the transformer 46 and battery 68 at one of the grids, thereby shifting the phase of the resultant voltage supplied to this grid and causing current to flow in the output circuit of such tube, resulting in the rotation of power motor 14 in the direction necessary to synchronize the controlling and controlled objects. Motor 14 also acts through the follow-up transmission means 11 to move rotor 9 into synchronism with rotor 4.

The phase and magnitude of the combined D. C. derivative potentials and the A. C. displacement potential determines the torque and speed of motor 14. During acceleration of the handwheel 1, the A. C. displacement signal is increased by the D. C. first derivative signal potential and is further greatly increased by the D. C. second derivative signal potential to give added torque to motor 14, whereas during deceleration, the combined displacement signal potential and the first derivative potential are reduced or even reversed in effect by the D. C. second derivative signal potential to give a less or reversed torque. Hence, in stopping, the current supplied to motor 14 is ordinarily actually thrown into reverse a sufficient time before the stopping position is reached to arrest its motion, and hence, with proper adjustment of the parts, substantial synchronism of the controlling and controlled objects is obtained without overshooting of the stopping position.

In order to preserve a substantially linear control of the outputs of tubes 39 and 40 in response to changes in the D. C. surge or derivative voltages applied to the grids of these tubes, it is necessary to have the A. C. grid bias voltage approximately 90° lagging the plate voltage. However, this relative position of the grid and plate voltages ordinarily causes an unduly large stand-by current in the outputs of tubes 39 and 40 and in order to reduce such stand-by current, the D. C. bias is applied to the grids of tubes 39 and 40 by use of battery 68 or other D. C. source. This D. C. bias serves to depress the zero reference line or axis of the A. C. bias voltage, thereby reducing the stand-by current to a desirably low value.

Fig. 2 illustrates diagrammatically typical potentials applied to the grids and plates of tubes 39 and 40. In this figure, 70 designates the alternating plate potential of substantially sine form having the reference axis OX corresponding to cathode potential. The D. C. bias supplied by the battery 68 serves to depress the D. C. grid potential to the axis O'X', upon which D. C. potential is superimposed the A. C. grid bias potential supplied from transformer 46 and designated 71. It will be noted that with no signal voltage supplied to the grids of the tubes 39 and 40, the curve 71 intersects the grid starting or critical voltage curve 72 of the tube at point 73 so that the tube passes current from point 73 for the remainder of the positive half cycle, which power is illustrated by way of example as less than one-fourth of the total power capacity of the tube, the same being an indication of the standby current of the tube.

If the D. C. bias from battery 68 were not employed, the wave 71 would be superimposed upon axis OX instead of O'X', in which case the tube would start to pass current at point 74 so that the tube would pass current, in the example shown, for more than half its positive half cycle, resulting in a large standby current.

Assuming that the hand wheel 1 is now turned with acceleration, the D. C. surge voltage $E_v$ due to the relative velocity of the handwheel raises the D. C. bias of one of the tubes 39 or 40 from O'X' to that represented, for example, by line 75, while the D. C. surge voltage $E_a$ due to the relative acceleration of the handwheel raises the D. C. bias voltage still further to that represented by line 76, for example. The grid A. C. bias potential is hence raised to the dotted line 77, i. e., about line 76 as an axis. The amplified alternating displacement signal potential 78 is superimposed upon the A. C. bias and D. C. surge potentials, thereby producing a resultant grid potential curve 79 which, by intersecting the grid critical voltage curve 72 at 80, serves to cause the tube to pass current for the major part of its positive half cycle, thereby effecting the operation of motor 14. It will be noted that the resultant grid voltage curve 79 in the region of grid critical voltage curve 72 is substantially parallel to anode voltage curve 70, thereby providing for a substantially linear control of the output of the tube, as is preferable. The resultant voltage curve 79 has been considerably raised by the D. C. surge voltages, thereby turning the tube on for a larger portion of its cycle.

It will be noted that the D. C. bias supplied by battery 68 may be omitted if the phase of the A. C. grid bias is shifted to reduce the standby current. This is shown in Fig. 3, wherein the A. C. bias 82 is shown lagging the plate voltage 83 by approximately 120°. In this case the addition of the D. C. surge potentials 84 and 85 and A. C. displacement signal 86 serves to raise the A. C. bias to the resultant voltage curve 87.

It will be apparent that resistors 32 and 33 could be omitted, if desired, in which event the D. C. surge potential supplied to the grids of tubes 39 and 40 would depend on the second derivative of displacement with respect to time only, the potential dependent on the first time derivative of displacement being thusly omitted. Likewise, if desired, choke coil 31 could be omitted, in which event lead 30 would be connected to the point of connection of resistors 32 and 33, so that the D. C. surge potential supplied to the grids of tubes 39 and 40 would depend on the first derivative of displacement with respect to time, the second derivative potential being absent.

Although the control system of this invention is described in connection with a continuously operable position control system, it is to be understood that the invention is not limited thereto, but is equally applicable to other servo mechanisms such as temperature or production control systems, and hence the expression "signal potential" is used in the following claims to include control potentials given off by various sources, such as those given off by thermocouples, photoelectric cells, the sensitive element of a follow-up system, etc. Also it is obvious that our system may be used to control any type of electric power motor besides a repulsion motor.

In accordance with the provisions of the patent statutes, we have herein described the principle and operation of our invention, together with the apparatus which we now consider to represent the best embodiment thereof, but we desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described our invention, what we claim and desire to secure by Letters Patent is:

1. A position control system of the character described, comprising a plurality of objects arranged to move in synchronism, synchronizing means interconnecting said objects, said synchronizing means including means for setting up an alternating potential responsive to the departure of said objects from synchronism, thermionic means for receiving said alternating potential and for amplifying and rectifying the same, said thermionic means having impedance in its output circuit for producing surge potentials, and motive means controlled from said thermionic means and said impedance for causing said objects to return to synchronism.

2. A position control system comprising a controlling object, a controlled object, driving means for said controlled object, a control circuit for said driving means, said control circuit having grid controlled rectifier means therein and means for applying A. C. and D. C. control potentials to said grid controlled rectifier means, said A. C. and D. C. control potentials being respectively responsive to the relative displacement of said objects and to a derivative thereof with respect to time, whereby said control circuit is rendered responsive to a function of the relative displacement of said objects and to at least two higher time derivatives of said function for varying the operation of said driving means.

3. In a position control system having a controlling object, a controlled object and means for driving said controlled object, an electrical circuit for controlling said driving means, said electrical circuit comprising means for producing an alternating potential responsive to the relative displacement of said controlling object with respect to said controlled object, thermionic tube means for detecting the phase of said alternating potential and for amplifying the same, grid controlled rectifier means for receiving said amplified alternating potential and for determining the operation of said driving means, and impedance means in the output circuit of said thermionic tube means, said impedance means serving to supply a D. C. potential responsive to a higher time derivative of the relative displacement of said controlling object with respect to said controlled object for application to said grid controlled rectifier means.

4. In a position control system of the character described, in combination, a plurality of objects arranged to move in synchronism, synchronizing means interconnecting said objects, said synchronizing means comprising means for setting up an alternating signal potential responsive to the relative displacement of said objects from synchronism, motive means for restoring synchronism between said objects, grid controlled rectifier means for controlling the supply of operating energy to said motive means, means for amplifying said alternating signal potential and for applying the same to said grid controlled rectifier means, and impedance means cooperable with said amplifying means for applying a D. C. surge potential to said grid controlled rectifier means, said D. C. surge potential being responsive to a higher time derivative of said relative displacement and cooperating with said amplified signal potential in controlling the action of said rectifier means.

5. In a position control system of the character described, in combination, a plurality of objects arranged to move in synchronism, synchronizing means interconnecting said objects, said synchronizing means comprising means for setting up an alternating signal potential responsive to the relative displacement of said objects from synchronism, motive means for restoring synchronism between said objects, grid controlled rectifier means for controlling the supply of operating energy to said motive means, means for applying an A. C. and D. C. bias to said grid controlled rectifier means, thermionic tube means for amplifying said alternating signal potential and for also applying the same to said grid controlled rectifier means, and impedance means operable with said thermionic tube means for also applying a D. C. surge potential to said grid controlled rectifier means, said D. C. surge potential being responsive to the first and second derivatives of said relative displacement with respect to time, the resultant of said A. C. and D. C. bias potential, said amplified signal potential and said D. C. surge potential serving to control the operation of said rectifier.

6. In a position control system of the character described, a controlling object, a controlled object, said objects being capable of relative movement, a source of power operatively associated with said controlled object, a potential producing means operatively associated with one of said objects, a potential responsive means operatively associated with the other of said objects, a continuously acting control circuit operatively associated with said potential responsive means, said control circuit comprising thermionic means for detecting and amplifying the potentials derived from said potential producing means, impedance means connected in the output circuit of said thermionic means for cooperating with said thermionic means for rectifying such potentials, and grid controlled rectifier means controlled by said amplified and rectified potentials, said grid controlled rectifier means serving to control said source of power, whereby said control circuit is continuously responsive to a predetermined function of relative displacement of said objects and of a higher time derivative of said predetermined function.

7. In a control system, power consuming motor means, grid controlled rectifier means for controlling the supply of operating energy to said motor means, means for producing an alternating signal potential, thermionic means and associated impedance means connected directly to said rectifier means and arranged for amplifying and rectifying said signal potential, whereby A. C. and D. C. control potentials are applied to said rectifier means when said signal potential has either a velocity or acceleration component, or both, to effect operation of said motive means in accordance with the magnitude of said A. C. signal and said D. C. derived potentials.

8. In a control system, power consuming motive means, grid controlled rectifier means for controlling the supply of operating energy to said motive means, means for applying an A. C. biasing potential to said rectifier means, amplifying and rectifying means, and an impedance cooperable therewith for applying A. C. and D. C. control potentials to said rectifier means, said potentials being derived from an A. C. signal fed to said amplifying and rectifying means.

9. In a control system, power consuming motor means, push-pull grid controlled rectifiers for controlling the supply of operating energy to said motor means, means for applying A. C. and D. C. biasing potentials to said rectifiers, thermionic amplifying and rectifying means, and an impedance cooperable therewith for applying A. C. and D. C. control potentials in 180° out of phase relation to said rectifiers.

10. A position control system of the character described, comprising a controlling object, a controlled object, motive means for driving said controlled object, an A. C. source, a transmitter energized from said source and operated from said controlling object, a control circuit for said motive means, a receiver fed from said transmitter and cooperating therewith for producing an A. C. signal voltage dependent on the relative displacement of the objects, said control circuit having thermionic amplifying and rectifying means for receiving said signal voltage and acting to amplify such voltage for use in controlling said motive means, and impedance means connected to said thermionic amplifying and rectifying means for producing D. C. surge potentials for aiding said A. C. signal in controlling said motive means, whereby the latter is controlled in accordance with the relative displacement of said objects and higher time derivatives thereof.

11. A position control system of the character described, wherein a synchronizing force is exerted between a pair of objects arranged to operate in synchronism and wherein a change in the electrical characteristics of said system is produced by departure of one of said objects from synchronism, comprising transmitter and receiver devices connected respectively to said objects, A. C. motive means operable for restoring synchronism between said objects, grid controlled rectifier means for controlling the operating energy supplied to said motive means, thermionic tube means serving both as thermionic amplifier and rectifier means fed from said receiver device and responsive to said change, said tube means being connected to said rectifier means, and impedance means in the output circuit of said tube means and cooperating therewith, whereby said rectifier means is controlled in accordance with said change and a plurality of derivatives thereof with respect to time.

12. A position control system of the character described, comprising a controlling object, means cooperating with said object for producing an A. C. signal of reversible phase, a controlled object, A. C. motive means for driving said controlled object, a control circuit for said motive means, said control circuit having push-pull thermionic means serving both as amplifying and rectifying means supplied with said A. C. signal, and impedance means connected to said amplifying and rectifying means and cooperating therewith for producing D. C. surge potentials, said thermionic and impedance means controlling said motive means in accordance with the relative displacement, velocity and acceleration of said objects.

13. A position control system of the character described, comprising a controlling object, a controlled object, motive means for driving said controlled object, a control circuit for said motive means, said control circuit having thermionic means serving both as amplifying and rectifying means, and combined inductive and resistive means connected to said amplifying and rectifying means and cooperating therewith, for producing D. C. surge potentials, said thermionic and impedance means controlling said motive means in accordance with the relative displacement, velocity and acceleration of said objects.

14. A positional control system comprising a controlling object, a controlled object and means for moving said controlled object substantially in positional agreement with said controlling object, including means for driving said controlled object, means for obtaining a signal E. M. F. proportional to relative displacement of said two objects, and a circuit having cooperative resistance, electromagnetic and electrostatic means, said circuit being adapted to receive said signal E. M. F. and to deliver a composite E. M. F. for controlling said driving means, said composite E. M. F. having components proportional to said relative displacement and to the first and second time derivatives thereof.

15. A positional control system in accordance with claim 14, in which the circuit delivering said composite E. M. F. is balanced with respect to a shunt mid tap.

16. A positional control system comprising a controlling object, a controlled object and means for moving said controlled object substantially in positional agreement with said controlling object, including means for driving said controlled object, means for obtaining a signal E. M. F. proportional to relative displacement of said two objects, and a circuit having cooperative shunt resistance and electromagnetic means and series electrostatic means, said circuit being adapted to receive said signal E. M. F. and to deliver a composite E. M. F. for controlling said driving means, said composite E. M. F. having components proportional to said relative displacement and to the first and second time derivatives thereof.

17. In a positional control system, a controlling device, a controlled object, driving means for said controlled object, and means for supplying a composite E. M. F. to control said driving means, including means for obtaining a primary control E. M. F. proportional to positional disagreement of said device and object, and means for obtaining therefrom additional control E. M. F.'s proportional to two time derivatives of the change of said disagreement, said last means comprising electromagnetic means for differentiating the change of a current and electrostatic means for differentiating the change of a voltage.

18. In a positional control system, a position controlling device, a remote controlled device, a servomotor for positioning the latter, transmitter and receiver means controlled by the relative positions of said two devices for producing an A. C. signal variable in phase and magnitude with their relative displacement, means for suppressing the fundamental A. C. leaving a variable D. C. including an impedance having reactance to produce a voltage across said impedance, thereby deriving from said original signal a first time derivative D. C. signal responsive to rate of change of relative displacement of said devices, and means for controlling said servomotor from a combination of said A. C. and time derivative signals.

19. Apparatus for positioning a controlled object in synchronism with a controlling object, comprising transmitter-receiver means for generating a variable-magnitude, reversible-phase signal voltage, push-pull thermionic tube means connected for receiving said signal voltage in out-of-phase relation, an impedance having inductance connected in the output circuits of said push-pull tube means and serving as a path for the current flowing through said tube means, said current flow through said impedance means serving to generate a voltage across said impedance proportional to the rate of change of the signal voltage, means for adding said rate-of-change voltage to said signal voltage, and servo means for operating said controlled object connected to be controlled by said signal and rate-of-change voltages.

20. A positional control system of the character described comprising a pair of objects, one of said objects defining a reference position, and control means normally operating said other object in synchronism with said first object, said control means including transmitter-receiver means responsive to loss of synchronism between said objects for producing an A. C. signal voltage, thermionic tube means actuated by said signal voltage to produce a unidirectional potential in the output circuit of said tube means variable in accordance with said signal voltage, a reactance in the output circuit of said tube means carrying current resulting from said unidirectional potential and developing surge potentials responsive to any variation of said current, means for receiving said surge potentials and said signal voltage and supplying potentials proportional to time derivatives thereof, and means actuated by said derivative potentials for modifying the effect of said synchronizing force.

21. A position control system of the character described comprising a pair of objects, control means normally operating said objects in synchronism, including transmitter-receiver means responsive to a change in electrical characteristics of the system for producing an A. C. signal voltage, thermionic tube means receiving said signal voltage and supplying a unidirectional signal output proportional thereto, means receiving said signal and including a reactance and a resistance for generating potentials proportional to the first and second time derivatives of change of said signal voltage, and means utilizing said derivatives for modifying the effect of said synchronizing force to maintain said objects in synchronism.

FRANCIS L. MOSELEY.
WILLIAM T. COOKE.

REFERENCES CITED

The following references are of record in the file of this patent:

UNITED STATES PATENTS

| Number | Name | Date |
|---|---|---|
| 1,554,698 | Alexanderson | Sept. 22, 1925 |
| 1,703,280 | Minorsky | Feb. 26, 1929 |
| 1,944,756 | Quarles | Jan. 23, 1934 |
| 1,971,823 | Long | Aug. 28, 1934 |
| 1,988,458 | Minorsky | Jan. 22, 1935 |
| 2,020,314 | Howe | Nov. 12, 1935 |
| 2,068,490 | Hull | Jan. 19, 1937 |